Figure 1:
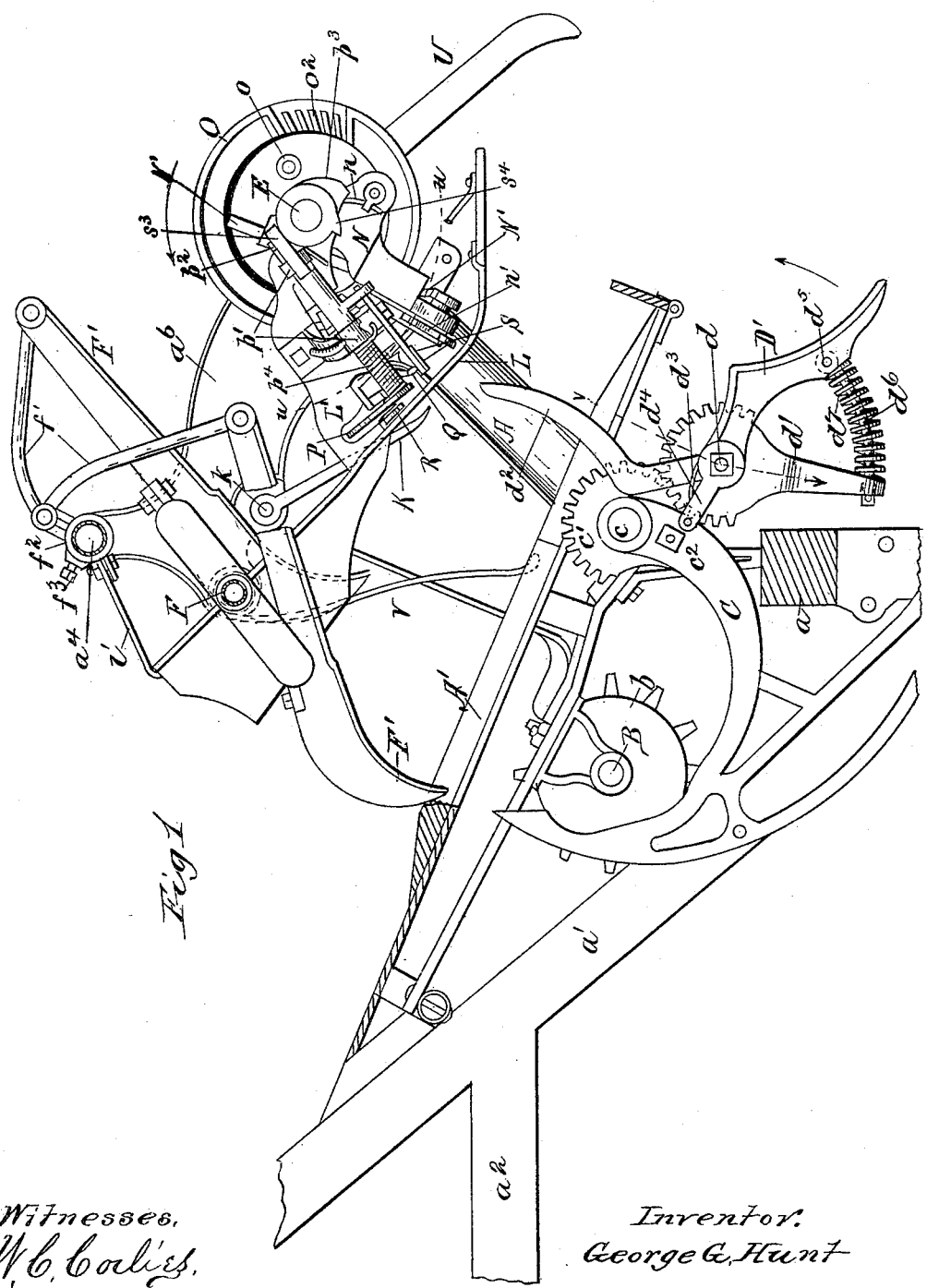

(No Model.) 6 Sheets—Sheet 1.

G. G. HUNT.
GRAIN BINDER.

No. 399,536. Patented Mar. 12, 1889.

Witnesses:
W. C. Carlies.
Irone Miller.

Inventor:
George G. Hunt
By Coburn & Thacher
Attorneys.

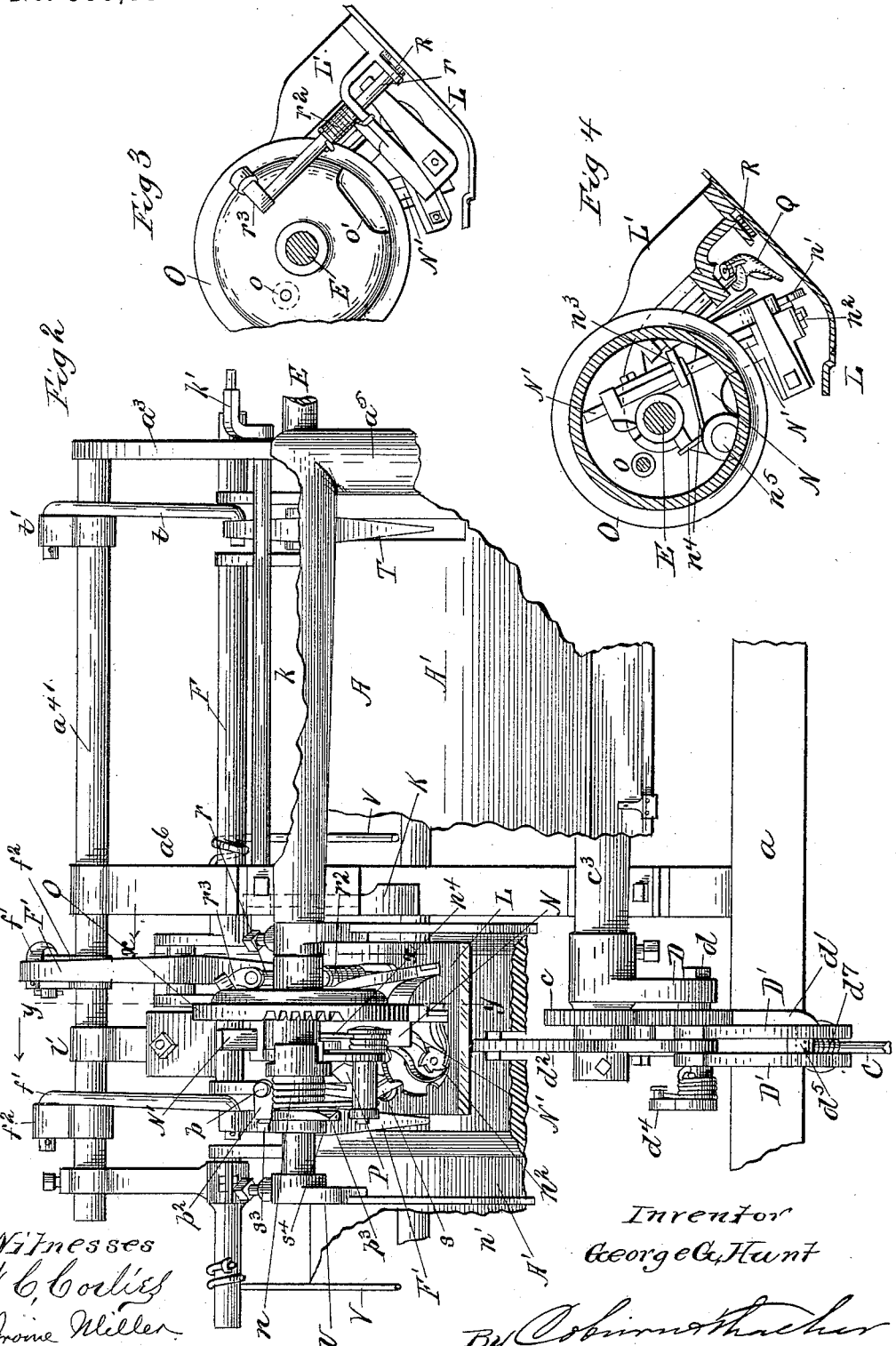

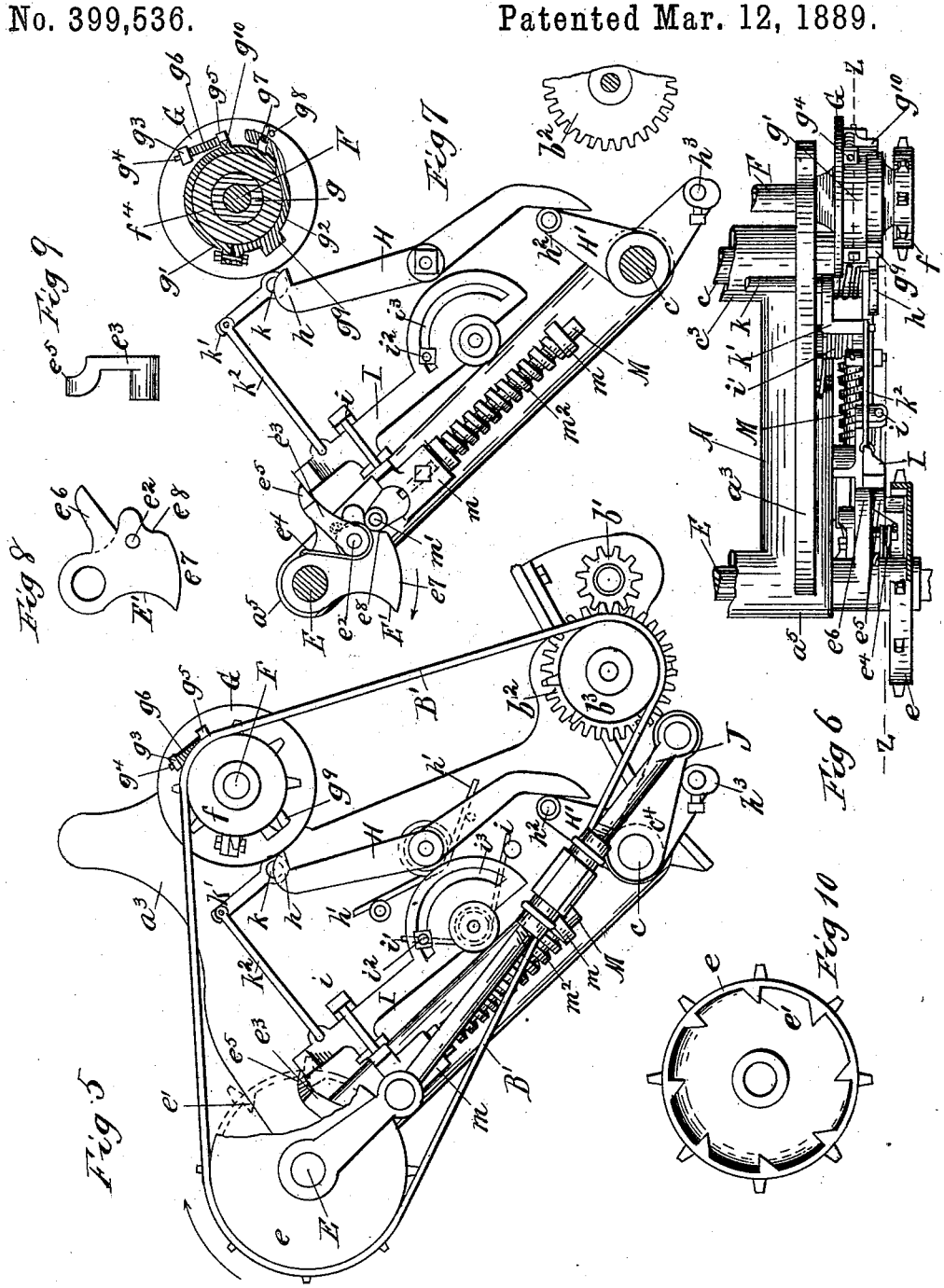

(No Model.) 6 Sheets—Sheet 4.
G. G. HUNT.
GRAIN BINDER.
No. 399,536. Patented Mar. 12, 1889.
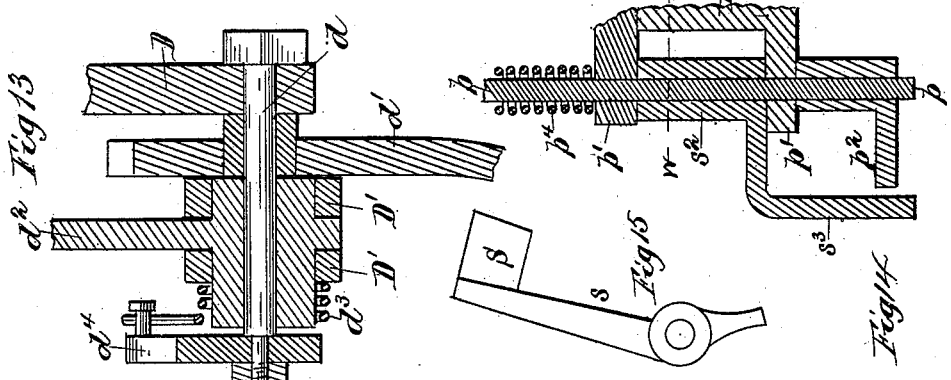
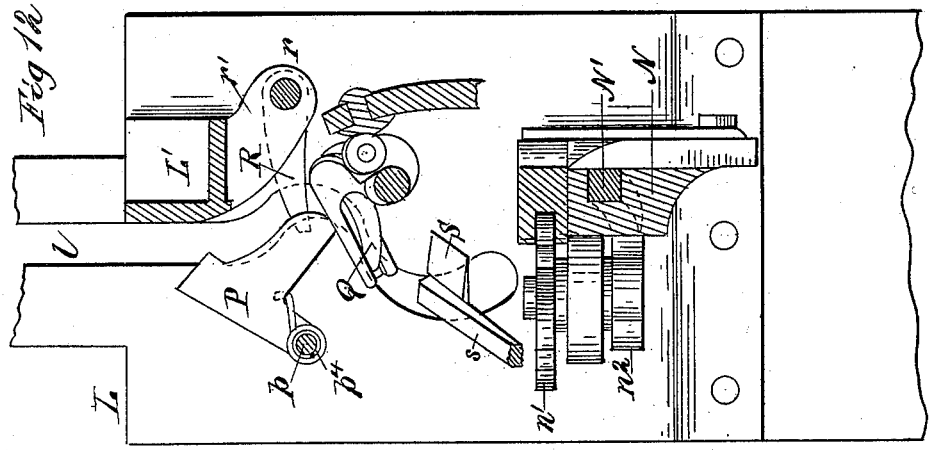
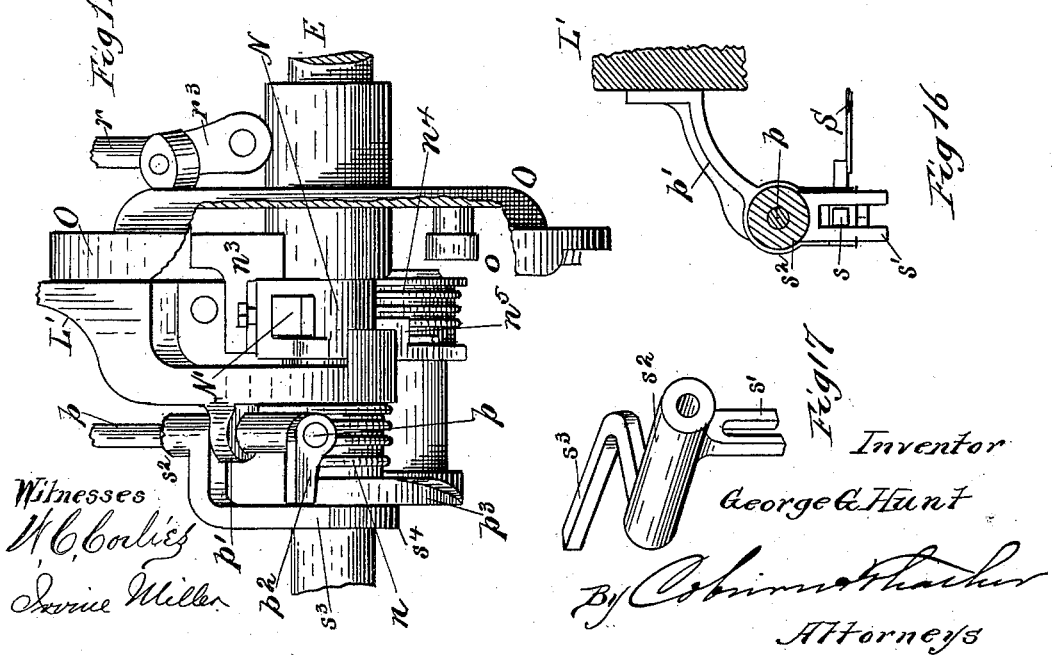
Witnesses
W. C. Cowles
Irvine Miller
Inventor
George G. Hunt
By Cashman & Thacher
Attorneys

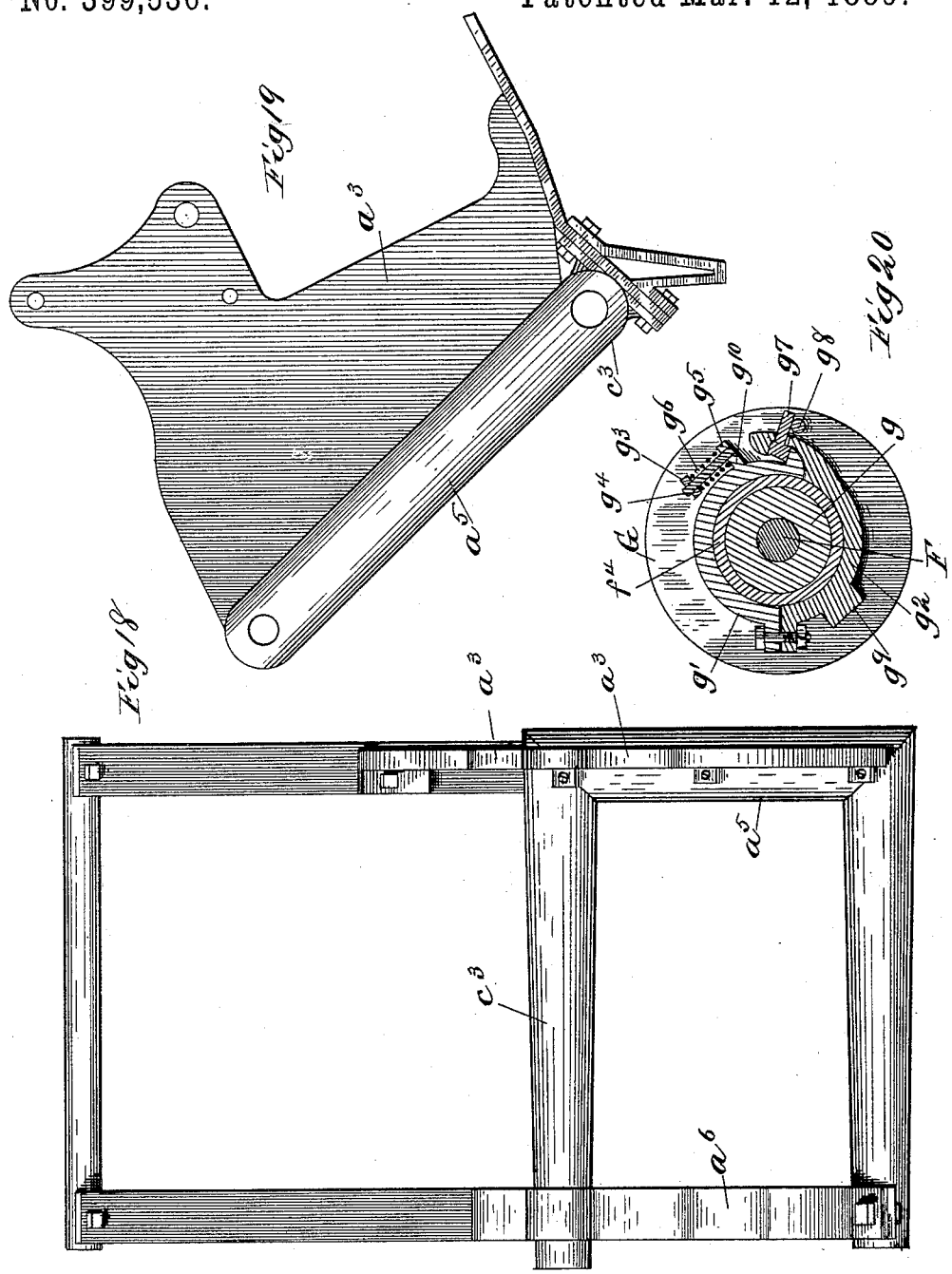

(No Model.)
G. G. HUNT.
GRAIN BINDER.
No. 399,536. Patented Mar. 12, 1889.
6 Sheets—Sheet 6.
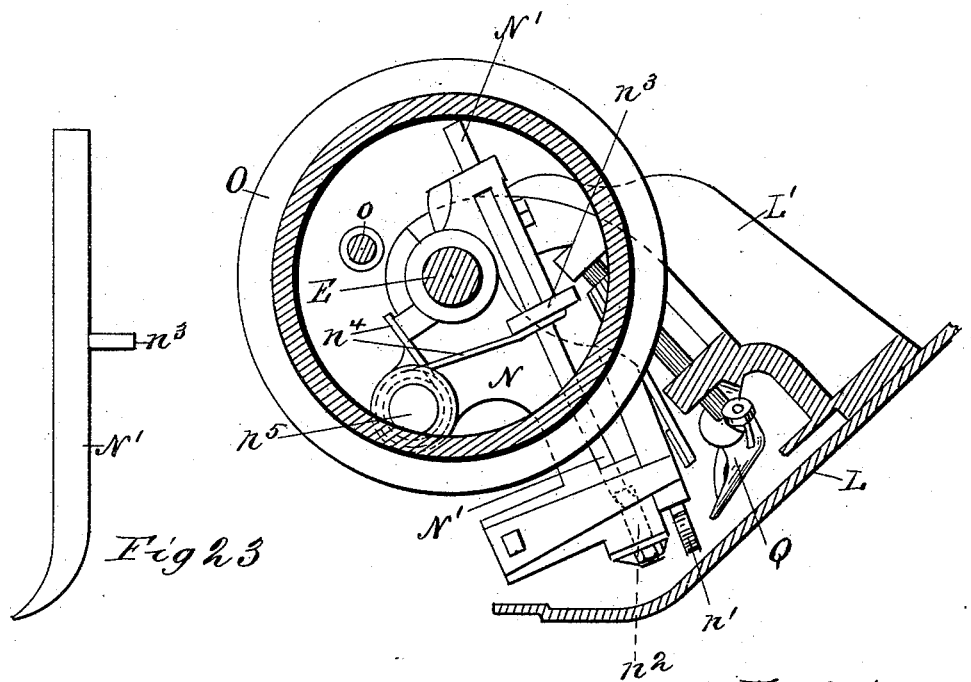
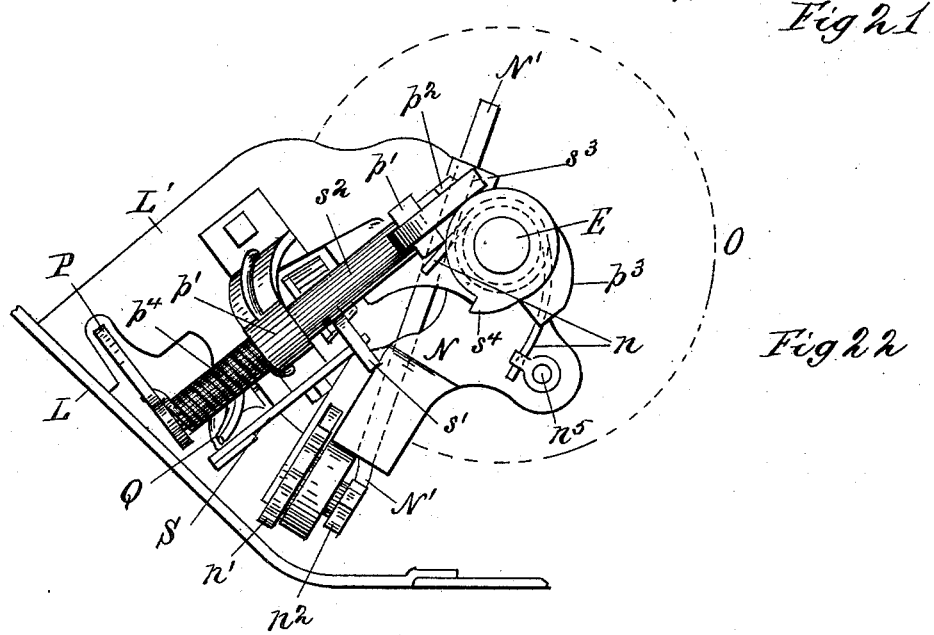
Witnesses,
N. C. Corlies
Irvine Miller
Inventor,
George G. Hunt,
By Coburn & Shacher
Attorneys.

UNITED STATES PATENT OFFICE.

GEORGE G. HUNT, OF BRISTOL, ILLINOIS, ASSIGNOR TO THE PLANO MANUFACTURING COMPANY, OF PLANO, ILLINOIS.

GRAIN-BINDER.

SPECIFICATION forming part of Letters Patent No. 399,536, dated March 12, 1889.

Application filed January 15, 1887. Serial No. 224,481. (No model.)

*To all whom it may concern:*

Be it known that I, GEORGE G. HUNT, a citizen of the United States, residing at Bristol, in the county of Kendall and State of Illinois, have invented certain new and useful Improvements in Grain-Binders, which are fully set forth in the following specification, reference being had to the accompanying drawings, in which—

Figure 1 represents a transverse section of a machine embodying my improvements, looking from the rear of the harvester; Fig. 2, an elevation of the forward portion of the grain-binder, looking from the stubble side of the machine, and with some portion of the grain-table broken away; Fig. 3, a detail section of the same, taken on the line $x\ x$, Fig. 2; Fig. 4, a similar section taken on the line $y\ y$, Fig. 2; Fig. 5, an elevation of the binder, looking from the front of the harvester; Fig. 6, a detail plan of the tripping mechanism; Fig. 7, a detail section of the same, taken on the line $z\ z$, Fig. 6; Figs. 8 and 9, detail views of the trip-arm and support detached; Fig. 10, a plan of the inner face of the sprocket-wheel at the forward end of the main or binding shaft; Fig. 11, a detail plan of the knotter-frame and its adjacent parts; Fig. 12, a plan section taken on the line $u\ u$, Fig. 1; Fig. 13, a detail section taken on the line $v\ v$, Fig. 1; Fig. 14, a detail plan section of the mechanism for operating the cord tucker and cutter; Fig. 15, a plan of the cord-cutter detached; Fig. 16, a detail section taken on the line $w\ w$, Fig. 14; Fig. 17, a perspective view of the device for operating the cord-cutter; Fig. 18, a plan view of the bracket-arm; Fig. 19, a front elevation of the same; Fig. 20, a vertical section of the friction-clutch mechanism; Fig. 21, a sectional view the same as Fig. 4, but enlarged; Fig. 22, a detail front elevation showing the knotter-frame, cord-holder frame, and connected parts, and Fig. 23, a plan of the pawl, detached, which operates the cord-holder.

The figures of the drawings up to and including Fig. 10 are on the same scale. The remaining figures are also on the same scale, but enlarged from the former.

My invention relates to automatic grain-binders in which packers and automatic tripping devices are used for the purpose of forming and sizing the bundles.

The invention relates to improvements in various parts of the machine, which will be hereinafter fully set forth.

I will proceed to describe in detail the construction and operation of a machine in which my present invention is practically embodied in one way, and will then point out definitely in the claims the improvements I believe to be new and desire to protect by Letters Patent.

The main parts of the harvesting-machine may be of any usual construction, and therefore I have not shown them fully in the drawings and shall not attempt to describe them, except as there may be occasion to allude to some of them incidentally in the description of the construction and application of my present improvements.

In the drawings, A represents the binder-frame, which is usually located outside of the main wheel of the harvester, $a$ being the cross-sill, $a'$ the inclined supports which extend upward and inward over the main wheel, and $a^2$ braces running to the elevator-frame. The usual inclined grain-table A′ is attached to and supported by this frame in any ordinary way, and the grain is delivered at its upper end by any ordinary elevator. The driving-shaft B, which communicates motion to the mechanism of the binder, is shown below the grain-table, and is in this instance provided with a sprocket-wheel, $b$, which receives motion from the harvester-gearing. At one end of this shaft there is a gear-pinion, $b'$, which imparts motion to the various devices of the binder, as will be presently described. The binding-arm or "needle-arm," as it is sometimes called, C is fixed on a shaft, $c$, which is also shown arranged below the grain-table. A gear wheel or sector, $c'$, is mounted on the binding-arm shaft, being secured thereto in any suitable manner. In the drawings it is shown fastened to the binding-arm itself by means of a bolt, $c^2$. This sector may be on the hub of the binding-arm, if desired. It is simply a matter of convenience how it shall be secured to the shaft, the only object being to have it move with the binding-arm. The binding-arm shaft passes through a long sleeve, $c^3$, running underneath the grain-table, and on this sleeve near the binding-arm is mounted a bracket, D, which may be fastened to the sleeve by any suitable device. In Fig. 2 of the drawings a binding-screw is shown for this purpose. This bracket extends outward and downward slightly in a direction parallel to the path of the binding-arm, and at its outer end is a stud-shaft, $d$, arranged at right angles thereto and across the plane of the binding-arm movement. Near the bracket an arm, $d'$, is mounted loosely on this stud-shaft. In Fig. 13 of the drawings it is shown on a sleeve or collar upon the shaft. At one end this arm is enlarged into a toothed sector, which engages with the similar device attached to the binding-arm, and at the other end it extends beyond this shaft and is slightly tapered, as seen in Fig. 1 of the drawings. An arm, $d^2$, is also mounted loosely on this same shaft and arranged in the same plane as the binding-arm. It is preferably made with an enlarged hub, which extends along the shaft on each side of the arm, as shown in Fig. 13 of the drawings. This arm extends up through the grain-table, as shown in Fig. 1 of the drawings, being held in such position by a spring, $d^3$, coiled around its hub and attached at one end to the arm and at the other to a crank-arm, $d^4$, fastened to the end of the stud-shaft and extending inward therefrom. It is obvious that this arm in the position named above stands across the path of the grain. Its purpose is to form a yielding grain-stop against which the bundle is formed for binding, but which does not afford serious resistance to the discharge of the latter when bound. It has no other function. Obviously this spring must be stronger than the trip-spring. A compressor, $D'$, is also mounted on this same stud-shaft. It is composed of two pieces or arms arranged one on each side of the arm $d^2$ and mounted loosely on the hub of the latter, as shown in Figs. 2 and 13. These pieces are connected together near their outer ends by a bolt, $d^5$, from which a rod, $d^6$, extends back to the outer end of the sector-arm $d'$, through which it passes, and is secured by some suitable device on its projecting end. A spring, $d^7$, surrounds this connecting-rod in the space between the compressor and the sector-arm. These are details in the construction of the compressor which may be variously changed.

It is obvious that the movement of the binding-arm in its plane will vibrate the geared sector-arm, thereby imparting a corresponding movement to the compressor, so that the latter will be brought up against the bundle in front when the binding-arm closes, and the spring between the compressor and sector-arm permits the former to yield as may be necessary in the operation of compressing and binding the bundle.

Constructed as above described, the bolt connecting the two parts of the compressor will strike against the grain-stop $d^2$ as it is thrown up in front of the bundle, and in any further movement forward these two will move together.

At the front end of the machine a bracket, $a^3$, preferably of metal, rises from suitable supports on the frame, and a rod, $a^4$, preferably gas-pipe, extends rearward from the upper inner corner of this bracket, while at the outer edge thereof stands the post portion $a^5$ of the frame for the main or cam shaft of the binding mechanism. A second bracket, $a^6$, is arranged some distance in rear of the former, being secured at its inner end to the sleeve portion of the support $a^5$.

The usual main or cam shaft, E, is mounted in its sleeve-support, and at its forward end is provided with a driving-wheel, $e$, which in this instance is a sprocket or chain wheel. The packer-shaft F is mounted in the front and rear brackets, $a^3$ $a^6$, mentioned above, is therefore located some distance above the grain-table, and is provided at its front end with a chain or sprocket wheel, $f$. A gear-wheel, $b^2$, is mounted on a short shaft in such position as to engage with the gear-pinion $b'$ on the driving-shaft, and upon its front face is provided with a sprocket or chain wheel, $b^3$, either made in one piece therewith or attached thereto. The sprocket-wheels $e$ $f$ $b^3$ are in the same plane, and a drive-chain, B', runs over them, as shown in Fig. 5 of the drawings. It is obvious, then, that motion from the driving-shaft B will be communicated to the wheel $b^2$, and thereby communicate the proper motion to the drive-chain for the purpose of rotating the wheels $e$ $f$ and the shafts to which they are attached.

The packers F' are mounted on cranks on the packer-shaft in the usual manner, and their upper ends are connected by links $f'$ to studs $f^2$, which are sleeved on the gas-pipe above the packer-shaft, as shown in Fig. 1 of the drawings. These sleeves are secured to the gas-pipe by means of a binding-screw, $f^3$, or other device, and hence may be adjusted both laterally on the rod or gas-pipe and around it, so that they may not only be fixed in the proper plane of the packers, but may also be regulated to vary the throw of the latter, by turning them back and forth, and thereby regulate the point at which they will strike into the inflowing grain, and also their approach to the grain-table.

It will be seen, then, that in my present improvement the packers are arranged above the grain-table and inflowing grain instead of below, as is usual, though this arrangement is not new, broadly considered. The packers are arranged one on each side of the binding-arm, and are constructed and adjusted so that they reach inward toward the elevator beyond the path through which the binding-arm moves and bring the grain down into the receptacle between the grain-table and the breast-plate against the grain-stop to form the bundle beneath an independent trip, which will be described presently. Provision is also made for making the operation of the packers intermittent, so that they will be stopped during the operation of binding the bundle and will be started when the latter is completed and the binding-arm opened again, and the mechanism whereby this is accomplished is constructed to operate so as to stop the packer-shaft at fixed points, determined for the purpose of leaving the blade of one of the packers, when at rest, alongside of the binding-arm when closed around the gavel, but either slightly in front or rear of the binding-arm, according as it is the front or rear packer which is stopped alongside of the binding-arm. The packer, stopping in this position, acts as a cut-off to separate the inflowing grain from the gavel, and for the purpose of aiding this operation and securing a good separation the blade of the packers is preferably made quite wide.

The mechanism which I have shown in the drawings, by means of which the packers are driven intermittently, is as follows: A disk, G, is made fast to the packer-shaft, and is provided with an elongated hub, $g$. The sprocket-wheel $f$ is loose on the packer-shaft, being mounted thereon by means of a hub-sleeve, $f^4$, fitted loosely upon the hub $g$ of the disk, as shown in Fig. 7 of the drawings. A spring friction-clutch is connected to the disk and applied to the hub of the sprocket-wheel. The clutch which I have shown in the drawings is not of my invention, but is old and well known in its general features. I will briefly refer to its construction. It is composed of two half rings or bands, $g'$ $g^2$, which are applied to the hub of the wheel and are connected together at one end by lugs and the bolt passing through them. The other end of the section $g'$ is connected to the disk by means of a lug, $g^3$, on the latter, through which a pin, $g^4$, passes loosely, the pin being rigid on a lug, $g^5$, projecting outward radially from the ring. A spring, $g^6$, surrounds this pin, the force of which is exerted to push the lug on the ring away from that on the disk, or, in other words, separate the two. A pin, $g^7$, passes through a slot in the free end of the ring-section $g^2$, and at its inner end is provided with a T-head, with which the ends of the two ring-sections engage on opposite sides by means of notches made therein. The outer end of the pin is engaged by a short stud, $g^8$, on the disk. The action of the spring $g^6$ is to force the band around in the direction of the headed pin, and the vibration of the latter upon its fulcrum-stud thus caused produces a tightening or clamping of the ring-sections upon the hub, thereby connecting the disk to the hub of the driving sprocket-wheel, and so rotating the packer-shaft. The movement of the section-rings in the opposite direction against the force of the spring will produce the contrary effect, loosening them upon the hub, and so disconnecting the wheel from the shaft. In order to effect unclutching of the wheel from the shaft, so as to stop the packers at the proper time, two radial lugs, $g^9$ $g^{10}$, are arranged on the rings diametrically opposite each other, and a lever, H, is pivoted to the front end of the machine, the upper end of which terminates in a toe, $h$, adapted to engage with these last-named lugs. A spring, $h'$, of any suitable construction and arrangement, is applied to this lever, so that its force will be exerted to vibrate the lever and throw the upper end into engagement with the clutch-rings. The lower end of the lever is brought into the plane of a bell-crank lever, H', mounted loosely on the shaft of the binding-arm, the upper member, $h^2$, of the lever being arranged in contact with the end of the lever H, while the lower member, $h^3$, is provided with a pin passing underneath the crank-arm $c^4$ of the binding-arm shaft. These parts are so arranged and adjusted that when the binding-arm is thrown open and the crank-arm on its shaft is brought into the position shown in Fig. 5, the lower member of the bell-crank lever will be depressed sufficiently to throw the upper member against the lower end of the lever H, thereby vibrating it in such way as to disengage the lever from the friction-clutch. The sprocket-wheel will then at once be clutched to the packer-shaft and the packers will be set in motion. As soon as the gavel is formed, however, and the binding mechanism set in motion by the trip, the crank-arm at once rises from the position shown in Fig. 5, thereby releasing the bell-crank lever and so the lever H, which, under the influence of its spring, is at once caused to engage with the clutch, thereby loosening it and so stopping the packers.

The lugs on the friction-clutch, as already explained, are arranged opposite to each other, and the lever H is arranged relatively thereto, so that at the point of engagement with one of the lugs the packers will be stopped with one of them in the position relative to the binding-arm which has been described above. If the lever is in time to come just in front of one of the lugs, the packers will be stopped almost instantly. If, however, the devices should be in position shown in Fig. 7, when the lever moves inward it will pass just behind the first lug and will engage with the next one, thus permitting nearly a half-revolution of the packer-shaft before stopping, and obviously there may be variations in these relations at the points between the two positions named, which will permit some movement of the packer-shaft, less, however, than a half-revolution. In no case, however, is this movement sufficient to interfere with the proper separation of the gavel from the inflowing grain. I have described this mechanism for connecting and disconnecting the packer-shaft and its driving-wheel only as an illustration of one way in which the result may be accomplished, and, as stated, the special clutch mechanism is not an invention of my own. Any other suitable mechanism for this purpose may be employed.

The crank-arm on the end of the binding-arm shaft is connected by a pitman, J, to a similar crank-arm on the end of the main or cam shaft in the usual way and for the usual purpose. An automatic tripping mechanism is provided for stopping and starting the binding devices, which I will now describe. The wheel $e$ is loose on its shaft and is provided with a flange-rim, on the inside of which are clutch-lugs or projections $e'$. A bracket or carrier, $E'$, for the clutch-pawl is secured to the shaft inside of this wheel. This carrier has on its inner face a stud-pin, $e^2$, on which is mounted the pawl $e^3$, to which is applied a spring, $e^4$, in the usual manner, so that its force will be exerted to throw the pawl forward toward the rim of the wheel. This pawl is shaped as shown in Fig. 9 of the drawings, its toe being widened or extended outward laterally, so that it will project beyond the rim of the wheel, and is then turned forward, so as to form a projection, $e^5$, beyond the rim of the wheel and radial thereto. The pawl-carrier also has a short arm or projection, $e^6$, extending outward from its upper edge in a direction about at right angles to its radius, and the outer edge of the carrier is elongated and presents a curved or cam surface, $e^7$, and a notch, $e^8$, as shown in Fig. 8 of the drawings.

It will be understood that the pawl-carrier is located on the shaft, so that the pawl is thrown forward under the influence of its spring and will engage with one of the clutch projections on the wheel, thereby clutching the wheel to the shaft for the purpose of turning the two together. A straight stop-arm, I, is pivoted at its lower end to the forward bracket, $a^3$, and extends upward toward the clutch-pawl until its upper end will come into the path of the extreme end $e^5$ of the pawl. The upper end of the stop-arm passes through a suitable loop or keeper, $i$, which permits a limited vibration of the arm upon its pivot, sufficient to enable it to be cleared from the path of the pawl. A spring, $i'$, is applied to this stop-arm in the usual way, so that its force is exerted to hold the arm in the path of the pawl, so that it will engage with the latter. In this instance this spring is connected to the bracket by having one end wound around the pivot-hub of the arm and fastened thereto, and fastened at the other end securely to a socket-piece, $i^2$, which is mounted in a circular slot, $i^3$, in the lower portion of the stop-arm, which is enlarged for this purpose. This spring-socket may be moved in the slot and secured in any position desired therein, so that it affords a ready means for regulating the tension of the spring, and consequently its force exerted upon the stop-arm. The trip-arm K is secured to a shaft, $k$, mounted in the front and rear brackets, heretofore mentioned, and arranged above the breast-plate. The trip-arm projects down from its shaft at one side of and below the breast-plate, as shown in Fig. 1. The shaft $k$ at its outer end is provided with a crank-arm, $k'$, and a link-rod, $k^2$, connects this arm with the upper end of the stop-arm. The breast-plate L is arranged in about the usual way above the grain-table, and is secured at its inner end to the gas-pipe or rod at the upper part of the frame, while its outer end is connected to the sleeve of the main or cam shaft by the knotter-frame. Now, in normal position the tripping devices are as shown in Figs. 1 and 5 of the drawings. Obviously as the grain is brought down by the packers into the receptacle underneath the breast-plate and against the grain-stop it will finally reach the trip-arm, and the latter will be gradually raised, which movement will rock the shaft to which it is fastened, thereby gradually pulling the stop-arm away from the wheel $e$, until finally it is disengaged from the clutch-pawl, which will then at once be brought into engagement with the wheel and the binding mechanism started. It will be noticed that in this instance the trip-arm is entirely disconnected from the grain-stop, against which the gavel is formed, and the bundle-compressor, and, in fact, is located at a distance from them, and is arranged above the gavel, instead of in front of it.

It will be understood, of course, that when the bundle is discharged the trip is released from its stress and the stop-arm, under the influence of its spring, will drop into position to engage the clutch-pawl again, which will be effected as soon as it comes round into proper position, when of course the wheel and main or cam shaft will be disengaged and the binding mechanism will be at rest. In order to lock the main or cam shaft against movement in either direction, the head of the stop-arm is enlarged, so that it will also stand in the path of the projection $e^6$, and it is obvious that when this projection is brought down upon the head of the stop-arm the shaft is securely locked from any further movement in that direction. A rod or bolt, M, is mounted in suitable loops or keepers, $m$, on the frame below the main or cam shaft and in line with the pawl-carrier when the latter is at rest. The upper end of this rod is provided with a rounded head or projection, $m'$, on which is a friction-roller, which is adapted to enter and fit the notch $e^8$ in the outer edge of the pawl-carrier. A spring, $m^2$, around the bolt between its keepers acts to hold it up into engagement with the pawl-carrier, as shown in Fig. 7, in which position it securely locks the latter from any backward movement, so that, in connection with the preceding device described above, the carrier and shaft to which it is connected are locked firmly against movement in either direction. The curved or cam surface $e^7$ on the pawl-carrier comes in contact with the head of the bolt and will depress it until the notch is finally reached, and the devices are so constructed and adjusted relatively that the stop-arm will be engaged with the pawl and release it from the wheel just a little before the locking-arm on the carrier reaches the former, while the spring-bolt M is intended to be properly seated in its notch just at the time of engagement of said arm with the stop-arm. In order to effect this and secure perfect accuracy or register of these locking devices, the spring of the locking-bolt is much stronger than the spring of the pawl, and it is intended that when the latter is engaged with the stop-arm, so as to unclutch the wheel, the locking-bolt will be on the incline of the notch in the pawl-carrier and the superior strength of its spring will be sufficient to crowd the bolt forward upon this cam-surface, thereby driving the pawl-carrier forward and turning the shaft with it just enough to bring the locking-arm down upon the head of the stop-arm.

The breast-plate L is provided with the usual slot, $l$, through which the head of the binding-arm passes to carry the cord around the bundle and to the tying mechanism. This slot at its lower end is bent first to the right and then to the left, as shown in Fig. 12 of the drawings, a construction, however, not new in this application. As already stated, the inner end of the breast-plate is attached to the gas-pipe rod above the front and rear brackets. This is effected by a link or rod, $l'$. The front end of the breast-plate is secured to the lower end of the knotter-frame $L'$, the upper end of which is mounted on the main or cam shaft—an ordinary mode of construction which makes this frame rigid.

The cord-holder frame N is hung loosely on the main shaft, so that it may swing to and from the knotter-frame. A spring, $n$, is applied to this frame in such way as to exert its force to vibrate it from the knotter-frame. This I accomplish by coiling the said spring around the sleeve of the knotter-frame and attaching one end thereof to said sleeve, while the other end is attached to the cord-holder frame near its upper end, thus leaving the space between the lower end of the said cord-holder frame and the knotter-frame clear. This spring is weak, so as to yield readily to the strain on the cord caused by the forming of the loop, so that the frame will readily swing forward toward the knotter-frame under this strain to give sufficient cord for the loop; but as soon as released the spring will swing the frame back away from the knotter-frame. In the holder-frame is mounted an ordinary notched cord-holder, $n'$, which is provided with a small ratchet-wheel, $n^2$, on its shaft—an ordinary construction of these parts. For the operation of the cord-holder I provide a straight pawl, N', which is mounted in suitable guides on the cord-holder frame, so that it may be moved up and down thereon by a straight sliding motion. The toe of this pawl is arranged to engage with the teeth of the ratchet-wheel on the cord-holder, and it is provided with a tappet, $n^3$, which is placed in the path of a pin, $o$, on the cam and gear-wheel O, so that as the latter is rotated the pin will strike against this tappet and drive the pawl downward, and thereby move the ratchet-wheel and cord-holder the required distance at the proper time.

A spring, $n^4$, is arranged to operate against the inside and lower face of this tappet, so that when the pin forces the pawl downward against the action of the spring the latter will lift the pawl again as soon as it is released from the pin. In the drawings this spring is shown wound around a stud, $n^5$, on the cord-holder frame, one end being fastened to the latter, while the other is extended underneath the tappet.

A cord tucker or placer, P, is secured to a rock-shaft, $p$, which is mounted in bracket-bearings $p'$ on the knotter-frame and extends upward to the main shaft, where it is provided with a crank-arm, $p^2$, with which a cam, $p^3$, on the main shaft engages at the proper time to oscillate this tucker-shaft. The cord-tucker is on the upper side of the breast-plate, arranged just at one side of the slot in the latter, and shaped about as shown in Fig. 12 of the drawings, its outer edge conforming generally with the upper bend in the slot. It is raised a little above the breast-plate. If desired, its edge may extend a little over the slot, so that in its position of rest, as shown in Fig. 12, it will accurately guide the cord to proper position on the bill of the knotting-hook Q. A spring, $p^4$, is wound around the tucker-shaft and applied so as to hold the tucker in the position shown in Fig. 12. The cam $p^3$ rocks the shaft in opposition to this spring at the proper time to turn the tucker downward and across the slot, thereby guiding and placing the cord down properly on the bill of the knotting-hook, and also holding the cord down as the hook revolves. When relieved from the cam, the spring acts at once to throw the tucker back into normal position.

A cord-supporter, R, is fastened to a rock-shaft, $r$, which is mounted in suitable bearings, $r'$, on the opposite side of the slot in the breast-plate. This supporter is in the form of an arm, and a spring, $r^2$, is wound around its shaft and applied in such way as to hold the arm in normal position directly across the slot, as shown in Fig. 12 of the drawings. At the upper end of the shaft is a crank-arm, $r^3$, which is preferably provided with an anti-friction roller. The tendency of the spring on the shaft is to hold this crank-arm up into contact with the outer face of the cam and gear-wheel, as shown in Fig. 11, and so long as the roller rests against the plane surface the supporting-arm will be held in the position shown in Fig. 12. A cam groove or depression, $o'$, is, however, made in this face of the wheel, which permits the crank-arm at the proper time to vibrate inward, thereby rocking the shaft under the influence of the spring in such a direction as to throw the cord-support downward out of the way of the cord. This groove is short, and as the roller passes out of it the parts resume their normal position, described above. This cord-support lies quite close to the breast-plate, so that its outer end, when across the slot, will be between the latter and the tucker.

The cutter S is on an arm, s, which extends upward at the front of the knotter-frame and is pivoted upon the end of the bracket-bearing $p'$, as shown in Fig. 1. The upper end of this arm, extending beyond the pivot, is embraced by a fork, $s'$, on a hollow shaft, $s^2$, which is sleeved upon the shaft $p$, and is provided with a bent crank-arm, $s^3$, which extends outward and then upward to the main shaft, where it is brought into the path of a cam, $s^4$, on said shaft, which acts to vibrate this arm, and so oscillate the shaft at the proper time to vibrate the cutter and sever the cord.

The knotting-hook Q is of the tying-bill type and has nothing special in its construction, as here shown, except that the jaws are bent slightly at their outer ends toward the breast-plate, as shown in Fig. 4 of the drawings, which is to facilitate the stripping of the loop therefrom. Usually this knotting-hook, when at rest, stands directly across the slot in the breast-plate, and the loop must consequently be pulled directly outward to be stripped from the hook. I arrange the gear-section $o^2$ on the wheel O, which drives the knotter, so that the latter will be stopped with the jaws thrown downward somewhat, as shown in Fig. 12 of the drawings, in which they are inclined about the same as the bend or inclination of the slot in the breast-plate below. It is obvious that the loop may be stripped from the hook in this position by a pull downward, and this is effected by the discharge of the bundle alone through the medium of the discharge-arm U, thereby avoiding the necessity of any device for stripping the loop from the hook.

It is well known that the heavy butts of the grain have a tendency to lag, and in order to overcome this and bring the grain up evenly to the binding mechanism I provide an additional packer, T, near the forward end of the grain-table, which is mounted on a suitable crank on the packer-shaft and is connected by a link, $t$, to a socket-piece, $t'$, on the gas-pipe. This packer operates directly upon the butts of the grain and facilitates the formation of the gavel straight along the grain-table. The device is not an absolute necessity, but is an adjunct, the use of which will be found desirable, especially in long heavy grain.

Check-springs V are applied to the machine, if desired, and in this case the rear spring is attached to the rear bracket, which forms a convenient piece for this purpose. This construction is shown in Fig. 2 of the drawings.

The operation of the machine is as follows: The binding mechanism being at the period of rest, the packers are in motion and the grain delivered at the upper portion of the grain-table is taken by the packers and brought down into the receptacle under the breast-plate against the yielding grain-stop and also against the cord, which lies in the usual position. As the gavel increases in size, it finally reaches the trip-arm above and gradually raises the latter, and at length releases the stop-arm from the clutch-pawl, and the binding mechanism is set in operation, as above described. The binding-arm at once commences its closing movement, thereby bringing into operation the shipping devices of the packer-shaft, whereby the movement of the latter is stopped at a certain point, leaving one of the packers in position to act as a cut-off, as described. During the formation of the gavel, and up to the time of closing the binding-arm around the gavel, the cord-placer, cord-supporter, and knotting-hook are in the position shown in Fig. 12 of the drawings. As the binding-arm closes, the compressor is brought up against the bundle in the manner already described, and as soon as the binding-arm is closed the cam on the main shaft operates the cord-placer to bring the strands down into proper position upon the jaws of the knotting-hook. The knotting-hook is then rotated in the usual manner to form the loop and stops with the end of its bill turned downward, as shown in Fig. 12. During this operation the cord-holder frame is pulled forward by the strain on the cord. The cord-cutter is then vibrated by the cam on the main shaft for this purpose and the frame falls backward under the influence of its retracting-spring. The pin on the cam and gear-shaft is located so as to operate the cord-holder at the proper time, as usual in these machines, and about the time the cord is cut. The cord-support is dropped away from the slot in the manner stated above, so as to let the strand down which has been resting upon it. It is, however, returned to place almost immediately and just before the binding-arm opens, so that when the latter operation is performed the cord will be laid across the knotting-hook and this support. As the binding-arm is opened, the bound bundle is delivered from the table by the discharge-arm U, the compressor in the meantime having moved out of the way and the grain-stop offering only a feeble resistance, which is readily overcome by the discharge-arm. The stop-arm at once engages with the clutch-pawl, thereby stopping the motion of the binding mechanism, which is then locked by the devices and in the manner already described. At the same time the clutch on the packer-shaft is relieved from its stop-lever and the packers are again set in motion, when the operations just described are repeated.

It will be understood, of course, that the several devices which perform these operations are to be so arranged and adjusted that their operations will be timed to secure the results as above described. It will be noticed that in this machine the binding mechanism and the packers are driven by chain gearing, and that one and the same chain drives both sets of devices, and that this chain is in constant motion and is driven by a wheel which is a part of the binder—that is to say, its driving sprocket or shaft is disconnected from the main frame of the harvester.

It will also be noticed that the chain-wheels which drive the packer and binding shafts are provided with separate devices, whereby they are independently connected to and disconnected from their respective shafts, so as to give an intermittent motion to each set of mechanism, the arrangement and operation being such that the periods of motion and rest of the respective devices alternate.

It will also be noticed that the packers are arranged above the inflowing grain and stopped at a certain fixed point, whereby certain results are obtained, which have already been mentioned; that the trip mechanism is entirely separate from the stop against which the gavel is formed, and is also arranged above the gavel, and that the compressor does not constitute the stop against which the gavel is formed and is operated positively by the binding-arm.

The employment of a grain-stop entirely separate and distinct from the trip mechanism and compressor has several advantages, among which are the following: In the operation of the machine, if the tripping function is exercised by the grain-stop in case tangled grain should clog this stop and prevent its proper operation, the machine will not operate in the proper manner, since the binding mechanism will be in constant operation and will soon clog the machine or so entangle the cord as to render stoppage necessary. Moreover, when the grain-stop acts as a compressor, any weakening of the springs or any disproportion in their strength will be liable to start the binding mechanism at the wrong time. As a direct advantage in the construction, the employment of a separate grain-stop enables me to dispense with all operating mechanism therefor, the grain-stop being entirely disconnected from the other movable parts of the machine and not being dependent upon their efficiency for its operation. These are some of the leading features of my present improvement. There are several others of minor importance, however, which I need not take space to specially enumerate. I do not, however, claim as my invention the broad improvement of combining with the stopping and starting devices a bracket on the main or cam shaft and a spring locking-bolt engaging with the bracket and adapted to move the said shaft slightly after disconnection from its driving mechanism. I only claim as of my invention the specific devices herein described and shown for this purpose.

It will be understood that I have shown and described a construction and organization of devices and mechanisms, whereby I have carried out my improvements in a practical way. At the same time I do not wish to be understood as limiting my invention to all of these devices in detail, or to their particular construction and arrangement, for, as in all machines, many variations may be made without departing from the leading features which characterize the improvement. In the practical use of my invention I claim the right to make changes of this description, so long as I retain the distinguishing features of my improvements.

Having thus described my invention, what I claim as new, and desire to secure by Letters Patent, is—

1. In a grain-binder, the grain-table, in combination with a binding-arm mounted below the table, a packer-shaft mounted above the table over the binding-arm shaft and provided with cranks, vibrating packer-arms mounted on said cranks and extending inward over the table, and shipping mechanism for the packer-shaft constructed to operate at certain predetermined points, whereby the packer-shaft is always stopped with one of the packers projected inward and downward, substantially as and for the purposes specified.

2. In a grain-binder, the grain-table, in combination with a binding-arm mounted below the table, a packer-shaft mounted above the table and provided with cranks, vibrating packer-arms mounted on said cranks and extending inward over the table, and shipping mechanism for stopping and starting the packer-shaft, constructed and arranged to stop the latter at a point which will leave one of the packer-arms projected inward and lying alongside the closed binding-arms, substantially as and for the purposes specified.

3. In a grain-binder, the packer-shaft, in combination with its drive-wheel mounted loosely thereon, the friction-clutch provided with diametrically-opposite radial lugs $g^9$ $g^{10}$, the spring-lever H, arranged to engage with one of said lugs at a certain fixed point for unclutching the wheel from the packer-shaft, the bell-crank lever H', having one of its arms arranged to engage the spring-lever H, and the rocking binding-arm shaft $c$ and its operating crank-arm $c^4$, said crank-arm being arranged to engage the other arm of the bell-crank lever H', substantially as and for the purposes specified.

4. In a grain-binder, the packers, in combination with a yielding grain-stop independent of both the compressor and trip-arm, against which the gavel is formed, substantially as and for the purposes specified.

5. In a grain-binder, the packers, in combination with the yielding grain-stop $d^2$, independent of the trip-arm and compressor, and the bundle-discharger U, substantially as and for the purposes specified.

6. In a grain-binder, the binding-arm, in combination with the packers, a yielding grain-stop against which the gavel is formed, and an independent yielding trip-arm separated entirely from the grain-stop and graduated to present less resistance than said stop, substantially as and for the purposes specified.

7. The bracket D, in combination with the shaft $d$ secured thereto, the grain-stop $d^2$, provided with an elongated hub, the spring $d^3$, the compressor D', composed of two separate arms mounted loosely on the hub of the grain-stop and connected together near their outer ends, the arm $d'$, to which the compressor is connected by sliding rod and spring, and the gear-sectors whereby said arm is vibrated, substantially as and for the purposes specified.

8. In a grain-binder, the binding mechanism and its main or cam shaft arranged above the grain, in combination with a clutch-pawl attached to and carried by said shaft, a driving-wheel mounted loosely on said shaft and connected thereto by the said pawl, a stop-arm, also arranged above the grain and in the path of the pawl, a trip-arm arranged above the grain and fixed on a rock-shaft, and a link-rod connecting a crank-arm on said rock-shaft with the stop-arm, substantially as and for the purposes specified.

9. The main or cam shaft E, in combination with the wheel $e$, mounted loosely thereon and provided with a flange-rim having projections $e'$, as described, the spring clutch-pawl $E^3$, carried by the shaft and adapted to engage the said projections, its toe being widened to project laterally beyond the rim of the wheel and turned forward to form a projection, $e^5$, radially beyond the rim of said wheel, and the stop-arm arranged to engage with the said projection $e^5$, substantially as and for the purposes specified.

10. The main or cam shaft, in combination with a bracket, E', fastened thereto, a spring-pawl, $e^3$, pivoted to the bracket, a locking projection, $e^6$, on the bracket, and the stop-arm arranged to engage both pawl and lock, substantially as and for the purposes specified.

11. The bracket E', fastened to the main shaft and provided at its outer edge with a cam-surface, $e^7$, and notch $e^8$, in combination with a spring-pawl pivoted to the bracket, the stop-arm, the drive-wheel loose on the shaft, the yielding locking-bolt M, arranged to be engaged and depressed by the cam on the bracket and to just enter the notch therein at the moment the pawl is disconnected from the wheel, and the lock-bolt spring of greater strength than the pawl-spring, whereby the thrust upon the bolt will throw the bracket forward slightly to seat the bolt in the notch after the pawl is disengaged from the wheel, substantially as and for the purposes specified.

12. The main or cam shaft, in combination with the bracket E', fastened thereto and provided with the cam $e^7$, and notch $e^8$, the lock-arm $e^6$ on the bracket, the spring-pawl $e^3$, pivoted to the bracket, the drive-wheel loose on the shaft and provided with projections $e'$, the stop-arm I, the lock-bolt M, and its actuating-spring $m'$, stronger than the pawl-spring, all constructed and operating substantially as and for the purposes specified.

13. In a grain-binder, the breast-plate L, provided with the bent slot $l$ and the pivoted cord-placer P, arranged at one side of said slot and shaped to guide the cord into the knotting-hook, said cord-placer being provided with mechanism whereby it is vibrated at the proper time downward and across the slot to bring the cord into proper position, in combination with a cord-support pivoted close to the breast-plate and arranged to stand normally direct across the slot therein, and mechanism whereby the said support is turned away from the slot just as the bundle is bound and returns to its place just before the binding-arm opens, substantially as and for the purposes specified.

14. The pivoted cutter S, in combination with the shaft $s^2$, provided with the fork $s'$ and bent crank-arm $s^3$, and the cam $s^4$ on the main or cam shaft, substantially as and for the purposes specified.

15. The packers F', in combination with the links $f'$ and the studs $f^2$, sleeved to the rod $a^4$ and adjustable lengthwise of said rod, substantially as and for the purposes specified.

16. The packers F', in combination with the links $f'$, the studs $f^2$, to which said links are pivoted, and sleeves carrying the said studs and mounted on the rod $a^4$, said sleeves being independently adjustable around said rod as a center, substantially as and for the purposes specified.

17. In a grain-binder, the main or cam shaft, in combination with the packer-shaft, chain-wheels mounted on each, and a single drive-chain arranged and operating to drive both shafts, substantially as and for the purposes specified.

18. In a grain-binder, the binding mechanism, in combination with the packing mechanism, chain-wheels constructed and arranged for driving each respectively, a single chain for driving said wheels, and a chain-driving wheel mounted on the frame of the binder, whereby the entire chain-driving mechanism is attached to and removable with the binder, substantially as and for the purposes specified.

19. The main or cam shaft E, in combination with the chain-wheel $e$, mounted loosely thereon, the packer-shaft F, the chain-wheel $f$, mounted loosely thereon, clutch mechanism for connecting and disconnecting the said wheels and their respective shafts, a single chain, B', arranged to drive the wheels $e$ and $f$, and the chain-wheel $b^3$ mounted on the binder-frame, substantially as and for the purposes specified.

20. The main or cam shaft E, in combination with the chain-wheel $e$, mounted loosely thereon, the packer-shaft F, the chain-wheel $f$, mounted loosely thereon, clutch mechanism for connecting and disconnecting the said wheels and their respective shafts, a single chain, B', arranged to drive the wheels $e$ and $f$, the chain-wheel $b^3$, mounted on the binder-frame, the gear-wheel $b^2$, attached to said wheel $b^3$, and the driving-shaft B, provided with a pinion engaging with said wheel $b^2$, substantially as and for the purposes specified.

GEORGE G. HUNT.

Witnesses:
W. C. CORLIES,
A. M. BEST.